United States Patent [19]

Feather et al.

[11] 4,172,553
[45] Oct. 30, 1979

[54] APPARATUS FOR GAUGING HOLE POSITION IN PUNCHED MATERIAL

[75] Inventors: Larry M. Feather, Laurel; Joseph Ferrero, Severn, both of Md.

[73] Assignee: The United States of America as represented by the Secretary of the Army, Washington, D.C.

[21] Appl. No.: 810,327

[22] Filed: Jun. 27, 1977

[51] Int. Cl.² .................. G06K 5/00; B23F 23/08; G06K 7/10; G01B 11/28

[52] U.S. Cl. .................. 235/437; 33/174 B; 235/456; 235/458; 356/375; 356/378

[58] Field of Search .............. 234/34, 48; 73/158, 73/157; 356/157, 159, 156; 360/77, 36; 33/180 R, 174 R, 174 B; 235/437, 438, 439, 454, 458, 461, 470, 495

[56] References Cited

U.S. PATENT DOCUMENTS

| | | | |
|---|---|---|---|
| 2,089,272 | 8/1937 | Lake | 235/495 |
| 3,441,715 | 4/1969 | Amacher | 235/458 |
| 3,529,169 | 9/1970 | Heaney | 356/157 |
| 3,620,629 | 11/1971 | Whittington | 356/156 |
| 3,762,822 | 10/1973 | Harvey | 356/159 |
| 3,846,915 | 11/1974 | Obermark | 33/174 B |
| 3,879,863 | 4/1975 | Georges | 235/458 |
| 3,897,156 | 7/1975 | Chasson | 356/157 |
| 3,955,627 | 5/1976 | Sonier | 235/437 |
| 3,993,893 | 11/1976 | Graf | 235/437 |

Primary Examiner—Robert M. Kilgore
Attorney, Agent, or Firm—John R. Utermohle; Barry N. Young

[57] ABSTRACT

An apparatus for verifying the tolerance of the positions of holes in in the form of a continuous web is moved over an opaque plate on which there are a plurality of transparent areas in the form of slits. The slits in the plate are illuminated by light sources placed above the plate. Photocells are placed below the plate in position with the slits so as to be responsive to the light coming therethrough. The moving web of punched material is positioned with respect to the plate such that when the holes are in tolerance they pass between pairs of slits, thereby blocking the light from reaching the photocells. If a hole position is out of tolerance, it passes over one or more of the slits, thereby permitting the corresponding photocells to provide an output. This indicates the presence of an out-of-tolerance hole. The disclosure further describes a multi-baseline technique, in which the longitudinal position of holes punched in the material is referenced to a single locator hole in the card, whose position with respect to the slits is periodically redefined, in order to provide improved accuracy in locating the position holes.

19 Claims, 16 Drawing Figures

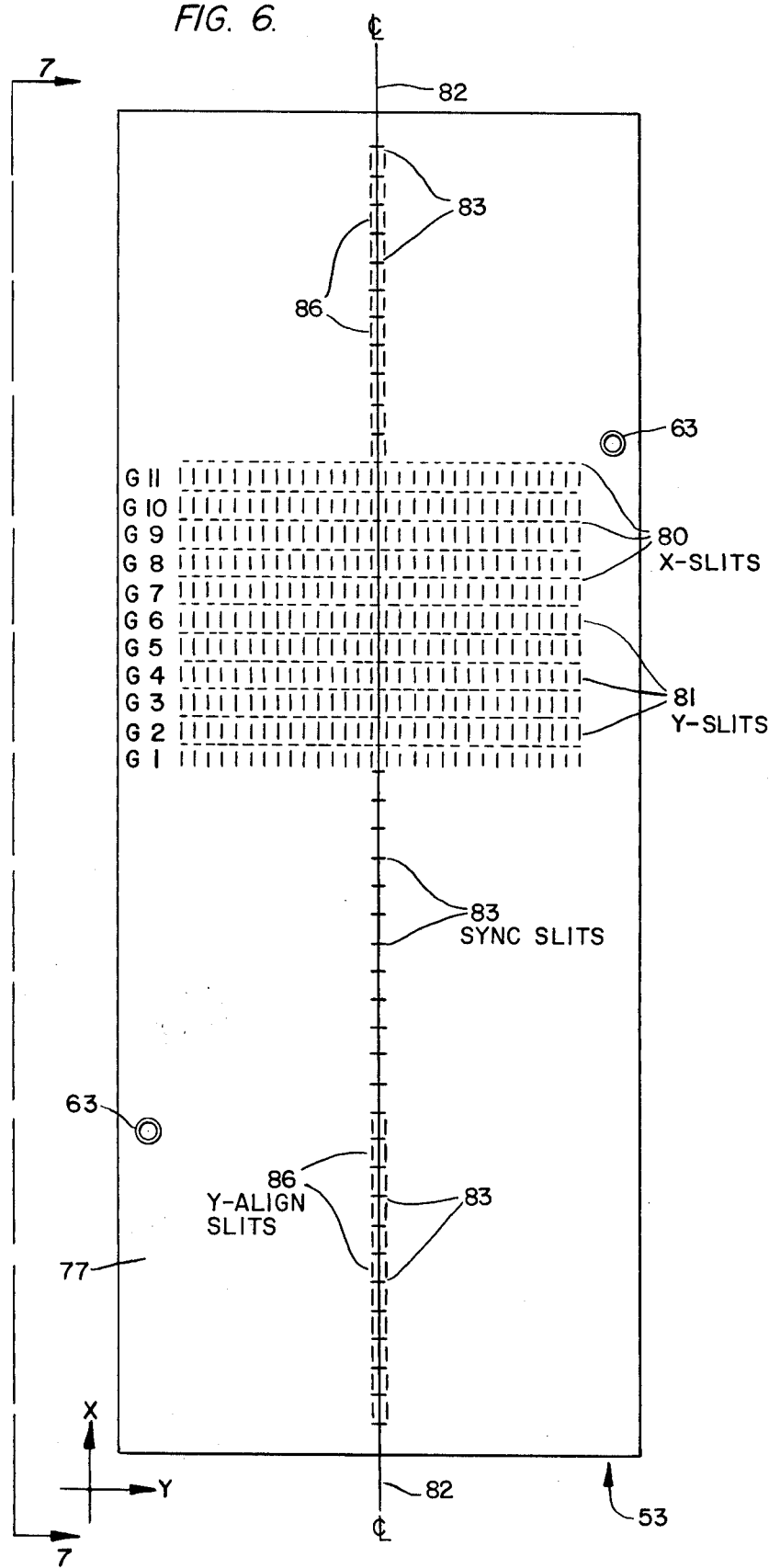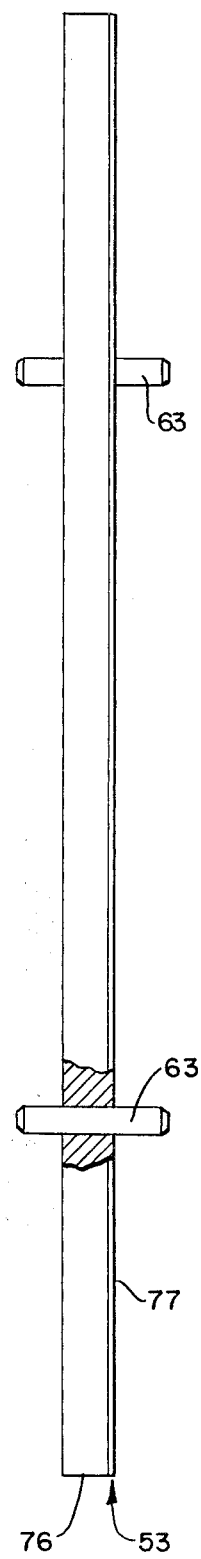

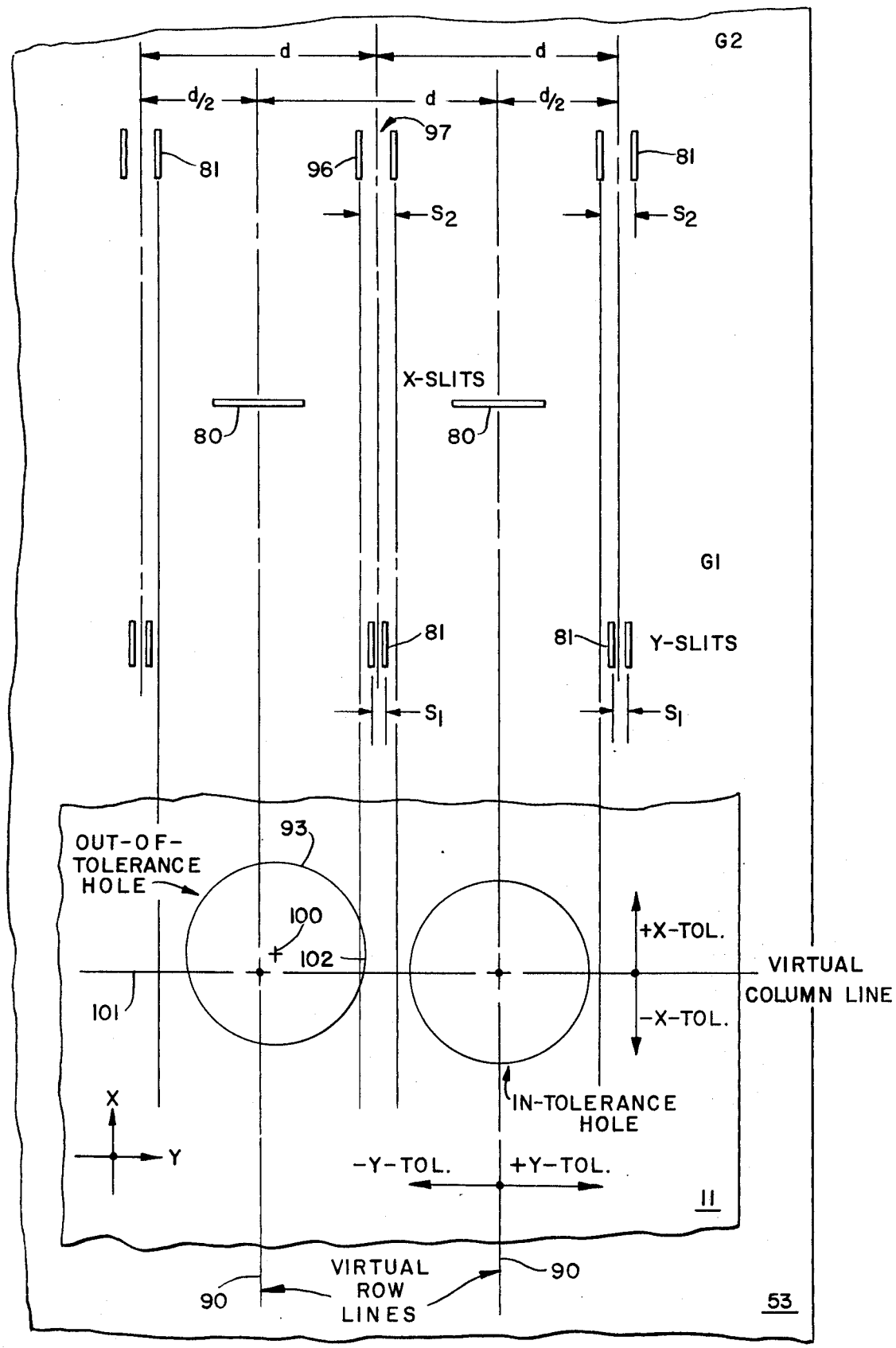

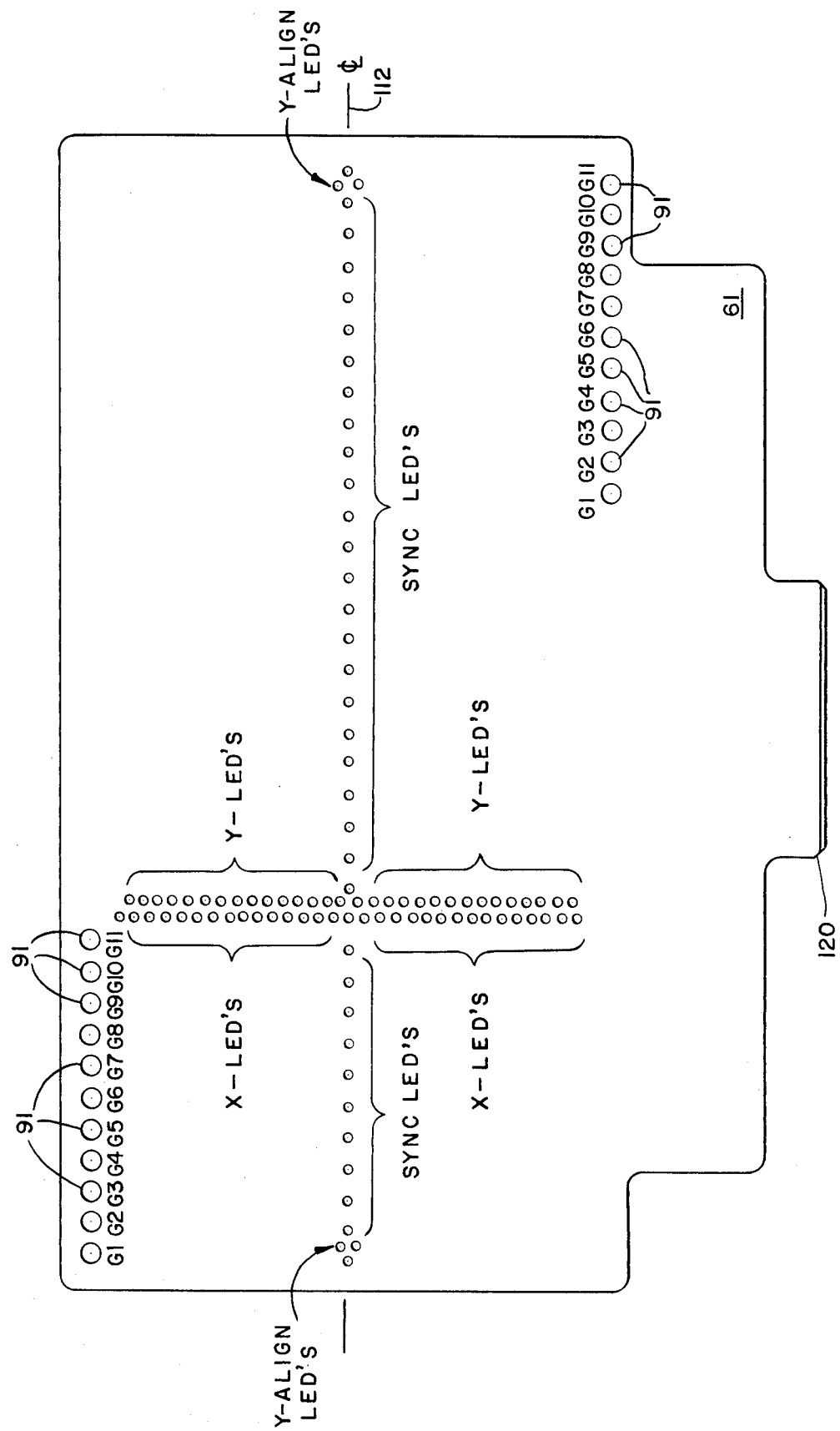

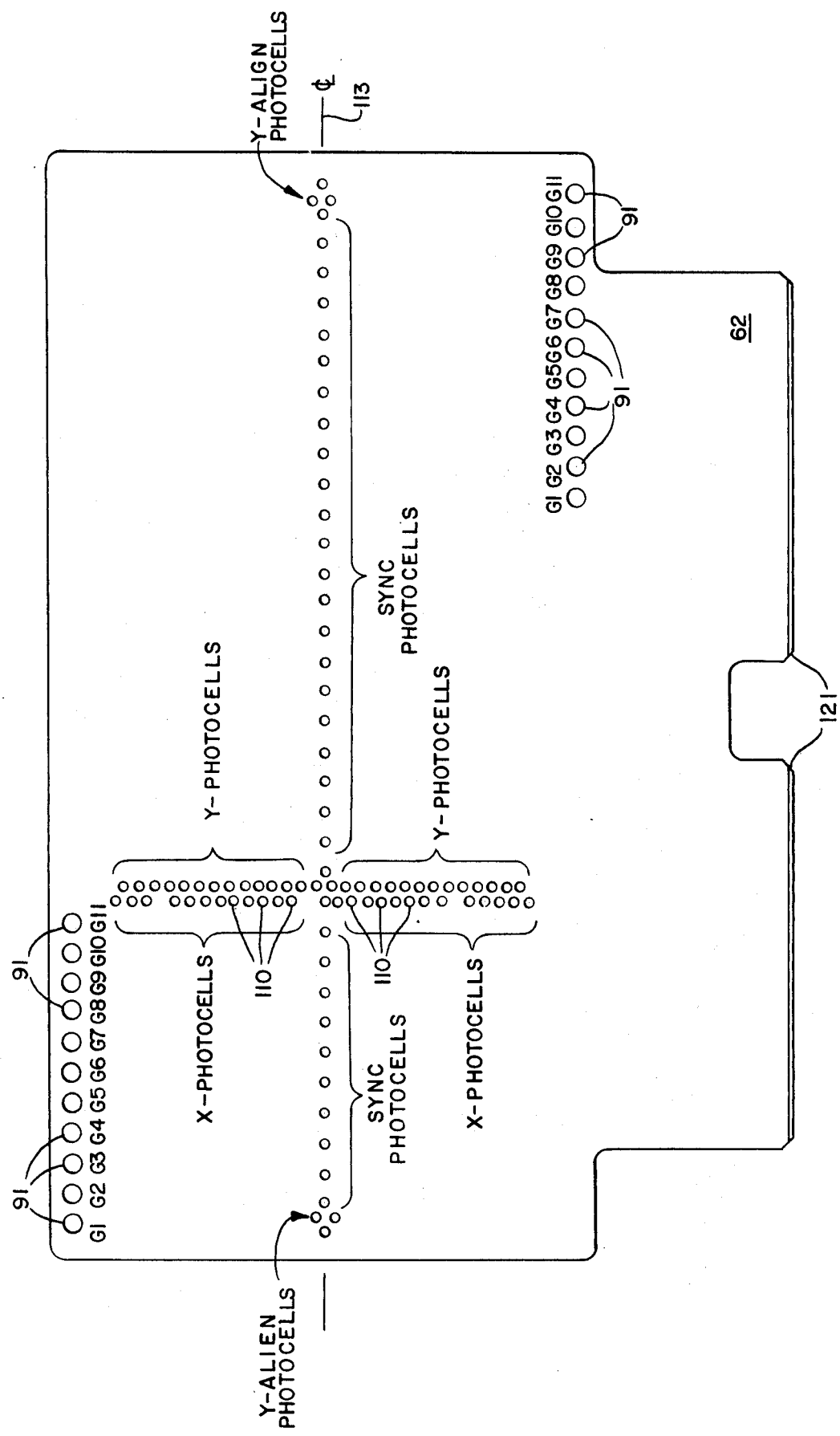

APPARATUS FOR GAUGING HOLE POSITION IN PUNCHED MATERIAL

BACKGROUND OF THE INVENTION

This invention relates generally to the field of gauging the tolerance of the positions of holes punched in material such as punched computer cards or paper tape and more particularly to an apparatus for automatically gauging the tolerance of the positions of individual holes punched in a continuous, moving web of material.

Many devices rely upon input information from punched cards or paper tape, for their operation. This information may be data to be processed by a computer or commands to control its operation or the operating parameters for some device. This information is provided by the position and format of the holes which are punched in the material. In many applications, it is essential to insure that the positions of these punched holes are held within certain tolerances in order prevent reading devices from misinterpreting the information. This is particularly true of electronic devices which derive their operating parameters from one or more punched cards, which are inserted in stationary readers, comprising a plurality of electrical contacts arranged in a pair of matrices, which are brought into contact with the punched card inserted between them.

The holes punched in the cards permit certain of the electrical contacts on one of the matrices to mate with corresponding contacts on the other matrix, thereby completing electrical circuits. The positions of the holes punched in the card determine which circuits are completed, and therefore what information is supplied to the device. Due to the large number and close spacings of the electrical contacts utilized in such matrices, slight misalignments of the positions of holes punched in the card may permit undesired electrical connections to exist, thereby providing erroneous information to the device. Similar problems exist with respect to card readers and paper tape readers, which read the information from punched cards or paper tape as it is passed across some sensing mechanism.

Occasionally, the mechanical punches utilized to punch the holes in such cards or tapes can become misaligned or out of tolerance due to mechanical wear. Furthermore, some cards are punched using two or more longitudinally staggered punches. These may become misaligned with respect to one another or the mechanism which steps the card from one punch to another may produce inexact stepping. Consequently, punched material must be gauged to insure that the positions of the holes that are punched therein are held within predetermined tolerances.

Previously available gauges have usually taken the form of a template of an accurately punched formatted section of material, over which is manually positioned a section of punched material. The material is then visually inspected for any misalignment of the punched holes with respect to the gauge. This method has the disadvantage of being slow and unreliable when gauging large quantities of material.

Another widely used technique is to verify that the data actually punched in cards is correct. Typically, this is accomplished by comparing the data actually punched in the cards with the data that was input via the keyboard of the keypunch. For example, see U.S. Pat. No. 3,596,831 to Parmer and U.S. Pat. No. 3,765,603 to Bean. These techniques have the disadvantage of requiring elaborate circuitry to store the data keyed into the keypunch, readers for the cards, and other circuitry to compare the date punched in the card with that keyed into the keypunch.

Systems which perform dimensional verification of punched cards or paper tape are typified by U.S. Pat. Nos. 3,684,164 to Davis and 3,558,862 to McMillan. The former reference discloses a system in which photocells are spaced from the punch by a distance equal to the column-to-column spacing on a punched card. As each column is punched and the card is advanced to the point where the next column is to be punched, the previously punched column of holes is aligned with the photocells. A light source illuminates one or more of the photocells through the punched holes to provide an output indication that the card has advanced the proper distance, and the punch is permitted to operate to punch the next column. Otherwise the machine is halted.

The latter reference (McMillan) discloses a system which utilizes the sprocket holes in a punched paper tape to determine the column-to-column spacing of punched data. As the tape is pulled across a photocell at a constant speed, the photocell is illuminated as each sprocket hole passes over its position. The photocell output is utilized to gate a constant frequency pulse source to a counter. By counting the number of pulses between holes, the distance between them is determined. As long as the number of pulses between holes falls within predetermined limits, an in-tolerance condition is indicated.

Both of these techniques suffer from the disadvantage that they perform gauging in only one dimension, i.e. longitudinally. Furthermore, gauging of individual holes is not performed. Rather, it is assumed that all holes in a column are perfectly aligned and only the column-to-column spacing is gauged.

There exists a need to quickly, efficiently and accurately gauge, in two dimensions, individual hole positions in large quantities of punched cards and paper tape. It is to this end that the present invention is directed.

SUMMARY OF THE INVENTION

Accordingly, it is an object of this invention to provide an apparatus for efficiently and accurately gauging large quantities of punched cards and paper tape.

It is a further object of this invention to provide an apparatus which will gauge hole positions in punched material while the material is in motion.

It is also an object of this invention to provide an apparatus which will permit two dimensional gauging of individual holes in punched material.

It is a still further object of the invention to provide an apparatus which will permit a variety of selectable, predetermined tolerances to be applied to gauging hole positions.

It is additionally an object of the invention to provide an apparatus which provides for accurately establishing a coordinate reference with respect to a formatted, punched section and which provides for accurate alignment of the punched material with respect to the gauging mechanism.

Moreover, it is an object of the invention to provide an apparatus which accomplishes the above objectives without the need for complicated devices and which will function without regard to the particular data punched in the material.

An apparatus for automatically gauging the tolerance of the positions of individual holes punched in a continuously moving web of punched material of indefinite length, which provides these and other advantages, may include, an opaque plate having arranged on it a plurality of transparent apertures through which light may pass, means for illuminating the transparent apertures with light, means for positioning a web of punched materal between the plate and the light such that the holes in the punched material are in a predetermined relationship with respect to the transparent apertures, so that certain in-tolerance holes pass between certain of the apertures, and light-detecting means positioned so as to be in optical correspondence with and responsive to any light passing through the holes in the web of punched material and the transparent apertures, for indicating out-of-tolerance holes.

BRIEF DESCRIPTION OF THE DRAWINGS

FIG. 6 is a plan view of an aperture plate.

FIG. 7 is a side elevation view, partially in section, of the aperture plate of FIG. 6.

FIG. 8 is an enlarged view of a portion of the aperture plate of FIG. 6, illustrating the arrangment of the slits and the manner in which they function to gauge the holes in a punched card in the Y-direction.

FIG. 9 shows an LED (light emitting diode) printed circuit board.

FIG. 10 shows a photocell printed circuit board.

DETAILED DESCRIPTION

Figure 1:
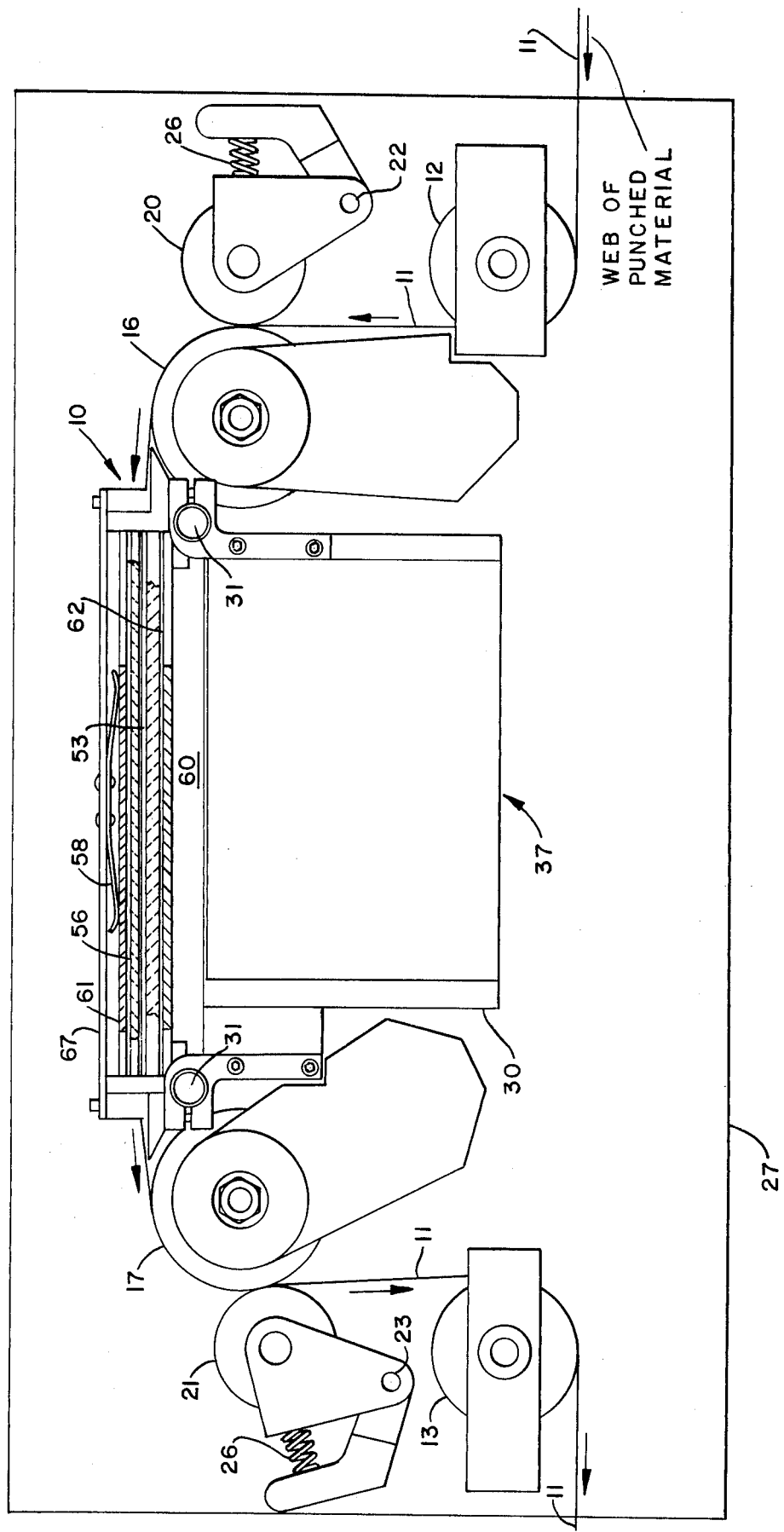
FIG. 1 is a front elevation view, partially in section, of a card gauge embodying the principles of invention.
Figure 2:
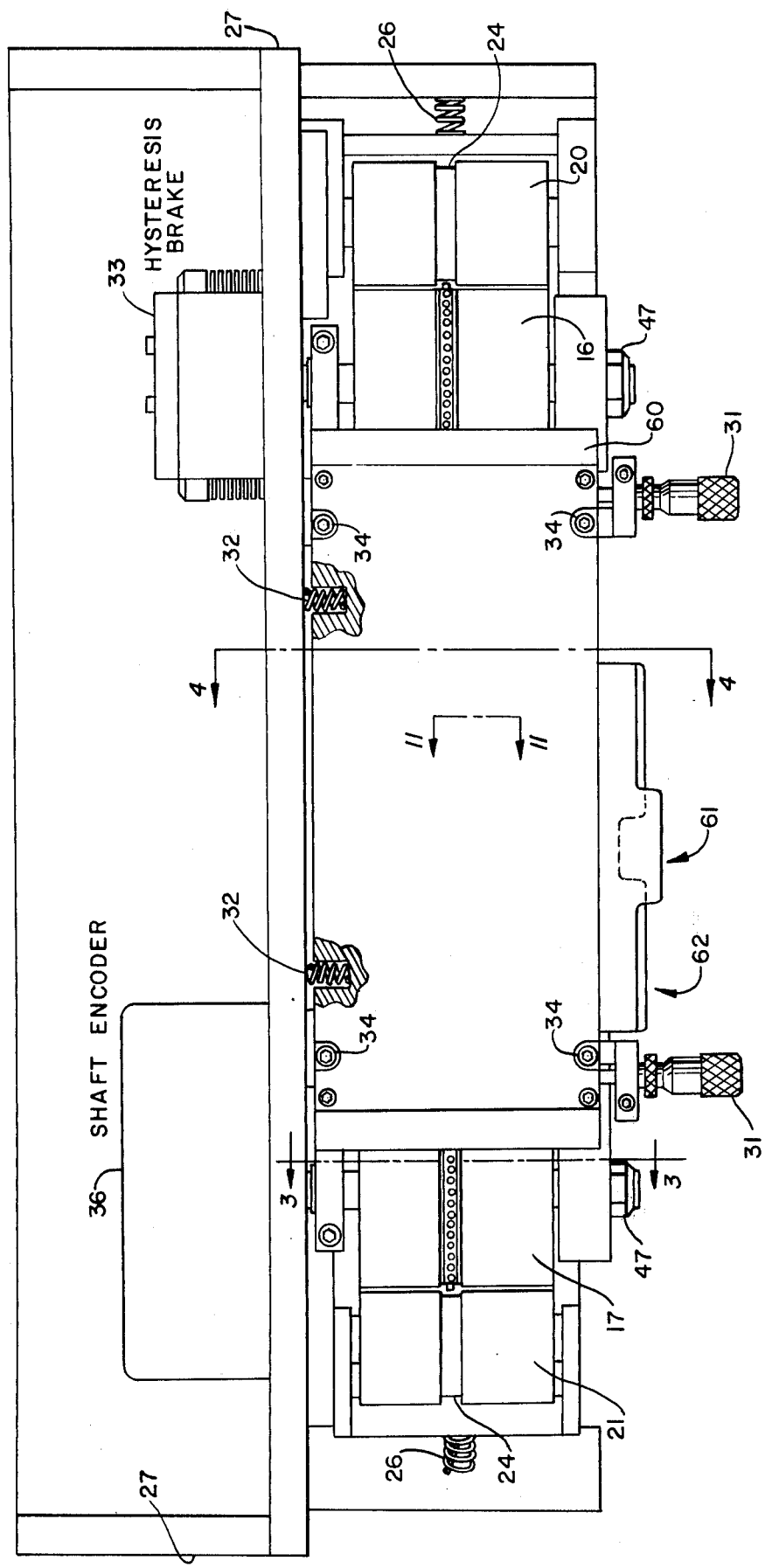
FIG. 2 is a plan view, partially in section, of the card gauge of FIG. 1.

Referring to FIGS. 1 and 2, there is illustrated a card gauge apparatus which may be utilized to practice the invention. There is provided a gauge head assembly 10 which actually performs the card gauging. Punched cards, in the form of a web of punched material 11, are pulled through the gauge head assembly in the direction indicated. As the web of punched material enters and leaves the card gauge, it is pulled over rollers 12, 13. The web of punched material is aligned and guided through the gauge head assembly by compound tracking wheels 16 and 17, shown in more detail in FIG. 3, acting in cooperation with pinch rollers 20 and 21. Pinch rollers 20 and 21, pivoted about points 22 and 23, respectively, are provided with springs 26 which serve to maintain the pressure of the pinch rollers against the web 11 and the compound tracking wheels 16, 17. As illustrated in FIG. 2, the pinch rollers are slotted at 24—24 to accommodate the sprockets of the tracking wheel and permit the surfaces of the pinch rollers and tracking wheels to contact the web uniformly across its width. The card gauge, which is mounted on a substantially U-shaped base plate support 27, contains no drive means. Web 11 must be pulled through the card gauge by external means, not illustrated.

The gauge head in which the card gauging is performed, comprises a second U-shaped frame 30, attached to U-shaped support 27. Rollers 12, 13, pinch rollers 20, 21 and compound tracking wheels 16, 17 are also attached to U-shaped support 27. The gauge head assembly 10 which actually performs the gauging, is adjustable with respect to the compound tracking wheels 16, 17, by micrometers 31—31, attached to U-shaped frame 30. These operate in conjunction with springs 32—32 to permit the gauge head to be aligned with respect to the web of punched material and the compound tracking wheels. Within the area 37 of the U-shaped frame 30 beneath the gauge head assembly 10, is contained electronic circuitry, not illustrated, to be more fully described hereinbelow.

Attached to the leading compound tracking wheel 16 is a hysteresis brake 33 which serves to maintain the web in tension as it is pulled through the gauge head 10. Attached to the second compound tracking wheel 17 is a shaft encoder 36 which outputs pulses as a function of its shaft rotation. These pulses are used for longitudinal measurements of the position of the web.

Figure 3:
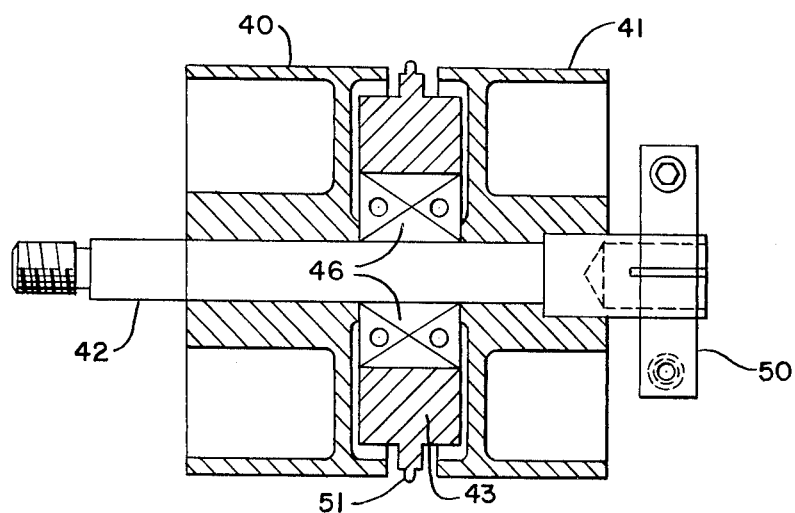
FIG. 3 is an enlarged partial section, with certain parts omitted, taken along the line 3—3 of FIG. 2, of a compound tracking wheel assembly.

FIG. 3 is a sectional drawing illustrating the construction of one of the compound tracking wheels. Both wheels 16, 17 are similar, comprising a forward wheel section 40 and a rear wheel section 41 attached to a shaft 42. Disposed between the forward and rear wheel assemblies, is a sprocket wheel assembly 43. The sprocket wheel assembly is supported by ball bearings 46—46 which allow it to rotate freely with respect to shaft 42. One end of the shaft 42 is threaded for receipt of a nut 47. The other end of the shaft 42 is hollow, as indicated by the dash lines, and provided with a clamp assembly 50 for receipt of the shaft of either the shaft encoder 36 or the hysteresis brake 33. This permits the compound tracking wheel to be directly coupled to either the shaft encoder or the hysteresis brake.

As will be explained shortly, the object of the compound tracking wheel is to utilize the sprocket pins 51 of the sprocket wheel assembly 43 and corresponding sprocket holes in the web of punched material, to provide a Y(transverse) reference for the web of punched material as it is pulled through the gauge head assembly. The ball bearings 46—46 minimize wobble of the sprocket wheel assembly, while its ability to rotate freely with respect to the shaft 42, prevents the inherent creep of a sprocket arrangement from adversely affecting the longitudinal measurement being performed.

Figure 4:
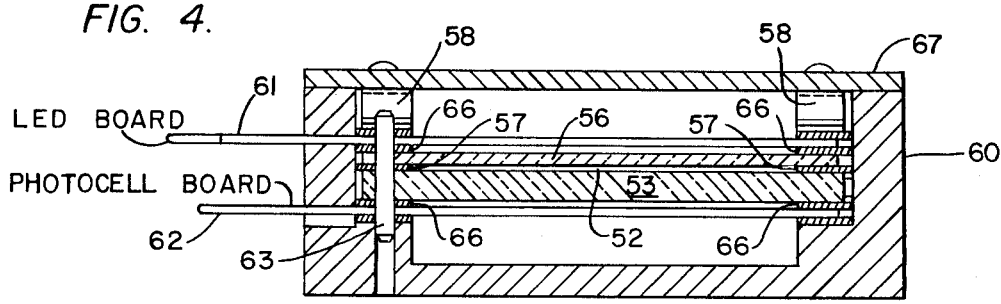
FIG. 4 is an enlarged vertical section, taken along the line 4—4 of FIG. 2, of the gauge head assembly of FIGS. 1 and 2.

Between the two tracking wheels 16, 17, lies the gauge head assembly shown in more detail in FIG. 4. The gauge head assembly comprises an slot or throat 52 through which the web of punched material is pulled. This slot is formed between an aperture plate 53, which is described in more detail hereinafter, and a glass cover 56 separated by shims 57—57, and secured to frame 60. Also included is an LED printed circuit board 61, shown in more detail in FIG. 9, located above the glass cover 56 and a photocell printed circuit board 62, shown in more detail in FIG. 10, located below the aperture plate 53. Dowel pin 63 is one of two such pins provided in the aperture plate 53, which are used for aligning the LED and photocell printed circuit boards with respect to the aperture plate. Spacers 66—66 are used to space the LED and photocell boards from the aperture plate 53 and the glass cover 56. The glass cover is optically clear and aids in keeping the punched material 11 flat against the aperture plate as it pulled through the gauge head assembly. The small slot 52 provides a means of keeping the surface of the aperture plate 53 relatively free of dust and debris, by the wiping action of the punched material as it passes through the gauge head assembly.

On the top of frame 60 is a cover 67 which is used to protect the gauge head assembly from damage. Attached to the inside of cover 67 are leaf springs 58—58. These leaf springs press on the LED board 61 when the cover is in place and serve to retain the sandwich consisting of the LED board, photocell board, aperture plate, glass plate and spacers in compression. The leaf springs permit the cover to be screwed down tightly against the frame 60, without exerting too great a force on the glass plate and aperture plate, which could cause them to break. The leaf springs further tend to prevent damage to the gauge head components should the web passing through the throat become jammed, by permitting the glass plate and LED board to move upwards.

The frame 60 which houses the gauge head assembly 10 is supported by the U-shaped frame 30, but free to move with respect to the U-shaped frame 30, so that the aperture plate 53 may be aligned with respect to the web of punched material 11 passing through the throat 52 of the gauge head assembly. As will be explained in more detail hereinafter, alignment is accomplished by physically positioning the gauge head assembly with respect to the punched material, by utilizing the micrometers 31—31.

Figure 5:
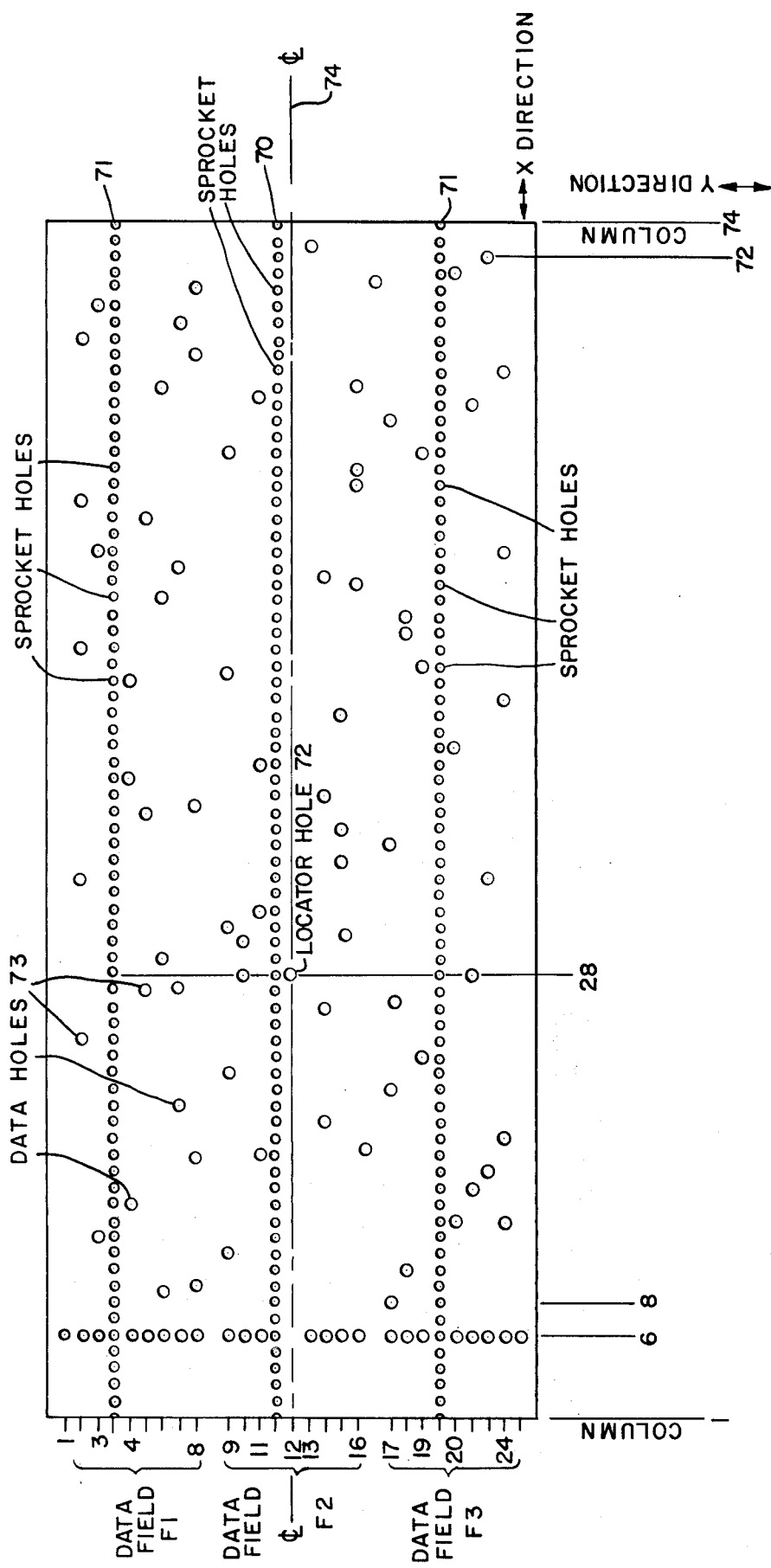
FIG. 5 illustrates a typical format of a punched card which may be gauged by the invention.

FIG. 5 illustrates a typical punched card of the type which may be gauged by the invention. Each such card is punched in a continuous web of material and is composed of a matrix of 72 columns and 24 rows, of which 65 columns and 24 rows may be punched with holes. The locations of the holes in the matrix are significant in terms of the information or data which is punched on the card. Although the invention is described with respect to the gauging of cards having the format of punched holes illustrated by the FIG. 5, the principles are equally applicable to any formatted punched material, including punched paper tape.

Typically, each card of the type illustrated in FIG. 5 is punched by using 3 longitudinally staggered 8-level punches. Hence the card contains three rows of sprocket holes 70, 71—71 and three distinct data fields F1, F2 and F3. Rows 1-8 comprise data field F1. Rows 9-16 comprise data field F2 and rows 17-24 comprise data field F3. Column 6 may contain holes punched in each row of the card except row 12. Columns 8-72 are used for the data and may contain a hole 73—73 in any of rows 2-23. Data is represented by the positions of the holes 73—73 in the matrix comprising columns 8-72 and rows 2-23. The hole positions are centered on the intersection of the virtual column and row lines forming the matrix of the card. Row 12 of the card is vacant except for one hole 72 punched in column 28. This hole 72 is referred to as the locator hole and is used as the X or longitudinal reference from which the longitudinal positions of all other holes in the card are measured as well as an index for the card. This will be explained in more detail hereinafter.

Adjacent to row 12, is a row of sprocket holes 70 which is used in cooperation with the compound tracking wheels 16, 17, to establish the transverse or Y reference for the matrix of holes. Nominal dimensions for the holes of the card illustrated in FIG. 5 are 0.046 inches for the sprocket holes 70, 71—71 and 0.070 inches for data holes 73—73. The grid spacing of the matrix is 0.1 inches square.

FIGS. 6 and 7 illustrate the aperture plate 53 in more detail. It comprises a glass plate 76 having mounted therethrough dowel pins 63—63. The side of the glass plate facing the web is coated with a highly abrasion-resistant, optically-opaque material 77 such as chromium or a chromium compound. Into this opaque surface 77 are etched a plurality of narrow slits which are optically clear and described in more detail below.

The etched surface 77 is further coated with an optically clear abrasion resistent material such as silicon monoxide to fill the etched slits and provide a plane surface. The aperture plate is manufactured using manufacturing techniques known to those skilled in the art of manufacturing optical devices, to insure very precise and accurate size and location of the etched slits thereon. A source for such an aperture plate is the Microline Division of Bausch and Lomb Co.

The slits in the aperture plate are divided into several different groups: (a) slits 80—80 parallel to the axis of the compound tracking wheels 16, 17, called X-slits, which are used for gauging the hole positions in the X direction; (b) slits 81—81 parallel to the longitudinal axis 82 of the aperture plate, called Y-slits, which are used for gauging the positions of holes in the Y direction; (c) slits 83—83 parallel to the X-slits 80—80 which are used for establishing an X-coordinate reference, called sync slits; and (d) slits 86—86 parallel to Y-slits and referred to as Y-align slits, used for Y-alignment of the gauge head assembly with respect to the punched material.

The X-slits 80—80 and the Y-slits 81—81 are arranged in a matrix of approximately 30 columns and 11 rows. The rows are labeled G1-G11. FIG. 8 is an enlarged view illustrating a portion of this matrix of slits in more detail. As shown, the Y-slits 81—81 are actually pairs of slits spaced a predetermined distance apart. This spacing, designated as S1, S2 . . . , corresponding to rows G1, G2 . . . varies for each row. However, the spacing, S, between slits of all pairs of slits in any given row in constant. The spacing between the mid points of pairs within any row is designated as "d" and is equal to the spacing between the virtual row lines 90—90 of the punched card. For the card illustrated in FIG. 5, this spacing is 0.1 inches. Typical dimensions for the slits illustrated in FIG. 8 are 0.5 mils by 30 mils for the X-slits, Y align slits, sync slits and before sync slits. For the Y-slits, each slit of the pair has a dimension of 0.5 mils by mils. One mil is equal to 0.001 inches.

As illustrated in FIG. 8, the spacing, S2, between the two slits of the pairs in row G2 is greater than the spacing, S1, between the slits in row G1. Similarly, as the number of the row increases from G1 to G11, the corresponding spacing between the two slits of the pairs increases. For gauging the punched card illustrated in FIG. 5, Table 1 gives the spacings between each of the Y-slits of a pair, for each of the rows G1 through G11, and the corresponding plus and minus Y-tolerance.

Table I

| Gauge Row No. | Spacing, S, Between Slits (inches) | Hole Y-Tolerance (inches) |
|---|---|---|
| G1 | 0.005 | ±0.0125 |
| G2 | 0.006 | 0.0120 |
| G3 | 0.007 | 0.0115 |
| G4 | 0.008 | 0.0110 |
| G5 | 0.009 | 0.0105 |
| G6 | 0.010 | 0.0100 |
| G7 | 0.011 | 0.0095 |
| G8 | 0.012 | 0.0090 |
| G9 | 0.013 | 0.0085 |
| G10 | 0.014 | 0.0080 |
| G11 | 0.015 | 0.0075 |

When the web 11 is aligned with respect to the aperture plate 53, the virtual row lines 90—90 of the punched cards are exactly midway between the pairs of Y-slits, 81—81, as shown in FIG. 8. As the web is pulled across the aperture plate, in the +X direction, the punched holes in the card pass between the adjacent pairs of Y-slits 81—81. As the spacing between the slits of a pair increases, the distance between adjacent pairs of slits, through which the punched hole must pass, decreases. By properly adjusting the spacing between the two slits of a pair, and hence the spacing between pairs of slits, it is possible to produce a gauge which will gauge any desired Y-tolerance. Thus, by insuring that no portion of a hole passes over any slit of a preselected row G1–G11, one can insure that the Y-positions of all holes in the punched material are within the tolerance determined by the pre-selected row. This is one of the bases underlying the present invention.

The gauging of cards to determine whether or not the positions of any of the punched holes are out-of-tolerance, is accomplished by illuminating a portion of the web of punched material with light from the LED's as it is pulled over the aperture plate and detecting with photocells whether or not any light passes through one or more of the X- or Y- slits of a pre-selected row, G1–G11.

Figure 11:
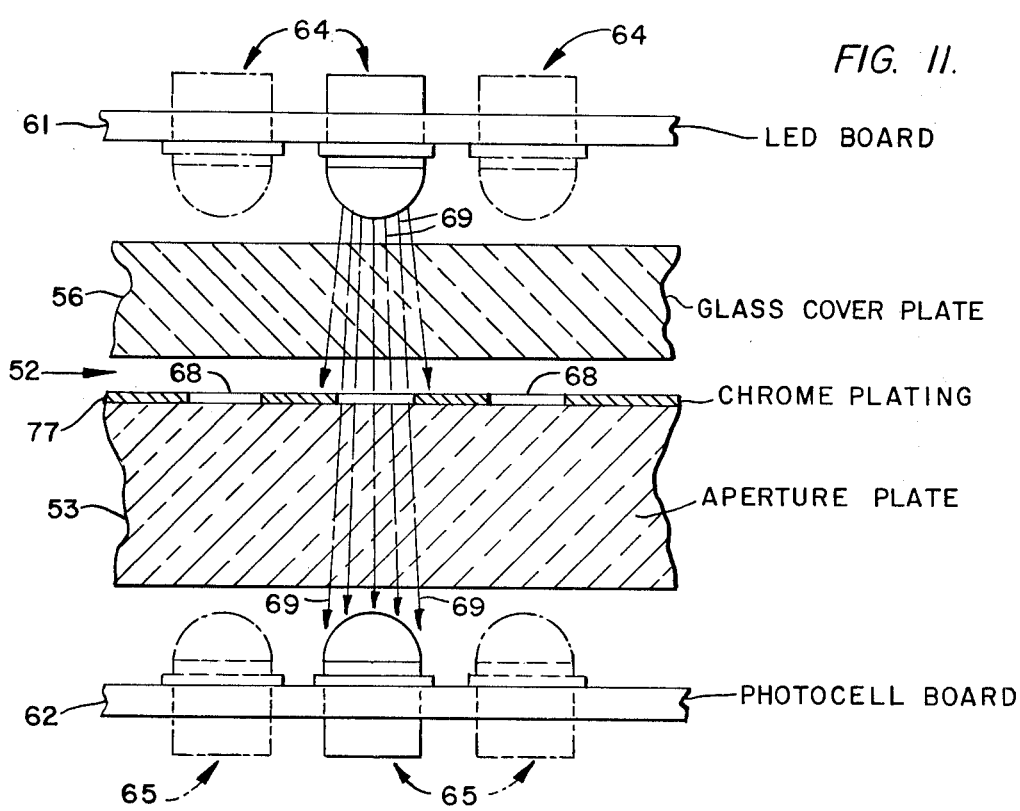
FIG. 11 is an enlarged vertical section of the gauge head assembly of FIG. 4, with certain parts omitted, illustrating certain relationships between the LED printed circuit board, photocell printed circuit board and aperture plate.

Referring again to FIG. 4, and to FIG. 11 which is an enlarged sectional diagram illustrating the relative positions of the LED's 64—64 and photocells 65—65 in the gauge head assembly with respect to the slits 68—68 in the aperture plate, the punched web 11 is illuminated by light rays 69—69 from the LED's configured on a printed circuit board 61 as shown in FIG. 9. The LED board is placed above the glass cover 56 with the LED's 64—64 pointed down toward the web of punched material 11. Below the aperture plate 53, there is provided a photocell board 62, shown in more detail in FIG. 10. The photocells 65—65 are arranged in a configuration corresponding to that of the LED's and pointed upward toward the aperture plate 53 and positioned so as to receive light coming through the various slits in the aperture plate.

When gauging cards, only one of rows G1–G11 is used at any one time. Selection of a particular row is based upon the desired Y-tolerance to be gauged. As previously mentioned, as the row number increases from G1 to G11, the spacing between the Y-slits of each pair, increases. This results in a corresponding decrease in the space between pairs of Y-slits through which the punched holes must pass and hence represents a tighter Y-tolerance.

As illustrated in FIGS. 9 and 10, each printed circuit board has two sets of alignment holes 91—91, each set having 11 holes labeled G1 through G11. The dimensions between corresponding holes of each set on each printed circuit board, exactly match the dimension between the dowel pins 63—63 mounted on the aperture plate 53. Selection of a particular row of slits G1-G11 on the aperture plate, is accomplished by physically positioning the LED and photocell printed circuit boards on the dowel pins 63—63 such that the dowel pins are through alignment holes 91—91 having the same designation, G1-G11, as the row of slits on the aperture plate 53 corresponding to the desired Y-tolerance. To change from one Y-tolerance to another, it is necessary to physically reposition the LED and photocell PC boards with respect to the aperture plate, within the gauge head assembly.

Dowel pins 63—63 and alignment holes 91—91 permit precise alignment of the LEDs and photocells with respect to the slits in the aperture plate. When the LED and photocell boards are placed on the dowel pins, their center lines 112-113, exactly align with the center line 82 of the aperture plate. Generally, there is provided an individual LED-photocell pair for each X-slit 80—80 and each pair of Y-slits 81—81 of a given row, G1-G11. There is further provided an LED-photocell pair for each of the sync slits 83—83 which lie between the LED and photocell boards. At each end of the line of sync LED-photocell pairs, there is provided a pair of LED-photocells, corresponding to one set of Y-align slits 86—86. Notice that there are 11 sets of Y-align slits at each end of aperture plate 53. However, only one set of Y-align slits at each end of the aperture plate is utilized, depending upon which of rows G1-G11 is being used for gauging. Electrical connections are made from the LED board and photocell board to the electronics contained within area 37, under the gauge head assembly, via electrical cables, not illustrated, which connect to the tabs 120, 121, of the boards.

In operation, punched cards such as illustrated in FIG. 5, in the form of a continuous web are pulled over the compound tracking wheels and through the gauge head assembly. The sprockets 51 of the compound tracking wheels mate with the center row of sprocket holes 70 in the punched cards. The sprocket wheels 43—43 provide a transverse, Y-coordinate reference for the gauge head assembly. The shaft encoder attached to tracking wheel 17 at the exit of the gauge head assembly, is used to provide a longitudinal, X-direction measurement of the web as it is pulled through the gauge head assembly. The hysteresis brake attached to the tracking wheel 16 at the entrance to the gauge head assembly, is utilized to provide tension to the web 11 as it is pulled through the gauge head. This enhances the tracking of the web through the gauge head assembly and tends to maintain the flatness of the web with respect to the aperture plate.

Prior to gauging, the aperture plate, in the gauge head assembly is first aligned with respect to the web of punched cards. This is done using the Y-align slits 86—86 in aperture plate and the locator hole 72 of each punched card of the web. The screws 34—34 securing the gauge head assembly mounting frame 60 to U-shaped frame 30, are first loosened, and the position of the gauge head assembly and aperture plate, with respect to the web, is aligned using micrometers 31—31, such that as the web is pulled through the gauge, the locator hole 72 exactly passes between the two Y-align slits 86—86 being used, at each end of the aperture plate. The spacing between the Y-align slits is such that the locator hole will just pass between them. In the embodiment disclosed, this spacing is 0.072 inches, for a hole diameter of 0.070 inches. The holes through the frame 60 through which the screws 34—34 pass, are slightly oversized and elongated, to permit the gauge head assembly to be positioned on frame 30 so as to achieve alignment. Y-alignment is correct when the photocells monitoring each of the pairs of Y-align slits at either end of the aperture plate, provide no output as the locator hole of the moving web, passes between the pairs of slits. At this point, the center line 74 of punched card 11 is exactly aligned with the center line 82 of the aperture plate 53. This exactly aligns the web of punched material with respect to the slits in the aperture plate. The screws 34—34 are then tightened down, securing the gauge head assembly and aperture plate to the frame. Once the aperture plate is aligned with respect to the web, gauging may proceed.

Gauging in the Y-direction is accomplished by pulling the web of punched material through the gauge and examining the output of the photocells beneath the pairs of Y-slits in a pre-selected one of rows G1–G11. There is provided on the aperture plate, pairs of Y-slits for each possible position of a hole in a column of the punched card. As the card passes through the gauge between the pairs of Y-slits, all holes in a column of the card are Y-gauged simultaneously by the Y-slits of the selected row G1–G11. If any hole in the column is out of tolerance in the plus or minus Y-direction, an output will be obtained from a photocell monitoring that pair of Y-slits over which the out-of-tolerance hole passes. This photocell output is provided to other electronic circuitry, not shown, contained within space 37 of frame 30, to give an out-of-tolerance indication.

FIG. 8 illustrates an out-of-tolerance hole 93 in the punched web 11, assuming row G2 is being used for gauging. As shown in FIG. 8, the center 100 of out-of-tolerance hole 93, is offset from the intersection of the virtual row line 90 and the virtual column line 101, in both the +x and the +y directions. As hole 93 passes over slit 96 of the pair of Y-slits 97 in row G2, the photocell beneath the pair of Y-slits 97 will provide an output, indicating an out-of-tolerance condition, since a portion 102 of hole 93 will uncover slit 96, permiting light to come through.

Gauging in the X-direction is accomplished in a somewhat different manner. As illustrated in FIG. 8, between each pair of Y-slits 81—81, there is provided an X-slit 80—80 centered on the virtual row lines 90—90 of each row of punched holes in the card. An X-photocell 110—110 is positioned beneath each of the X-slits in the pre-selected row, G1–G11. The outputs of these photocells are provided to digital logic gates, not shown.

Figure 12:
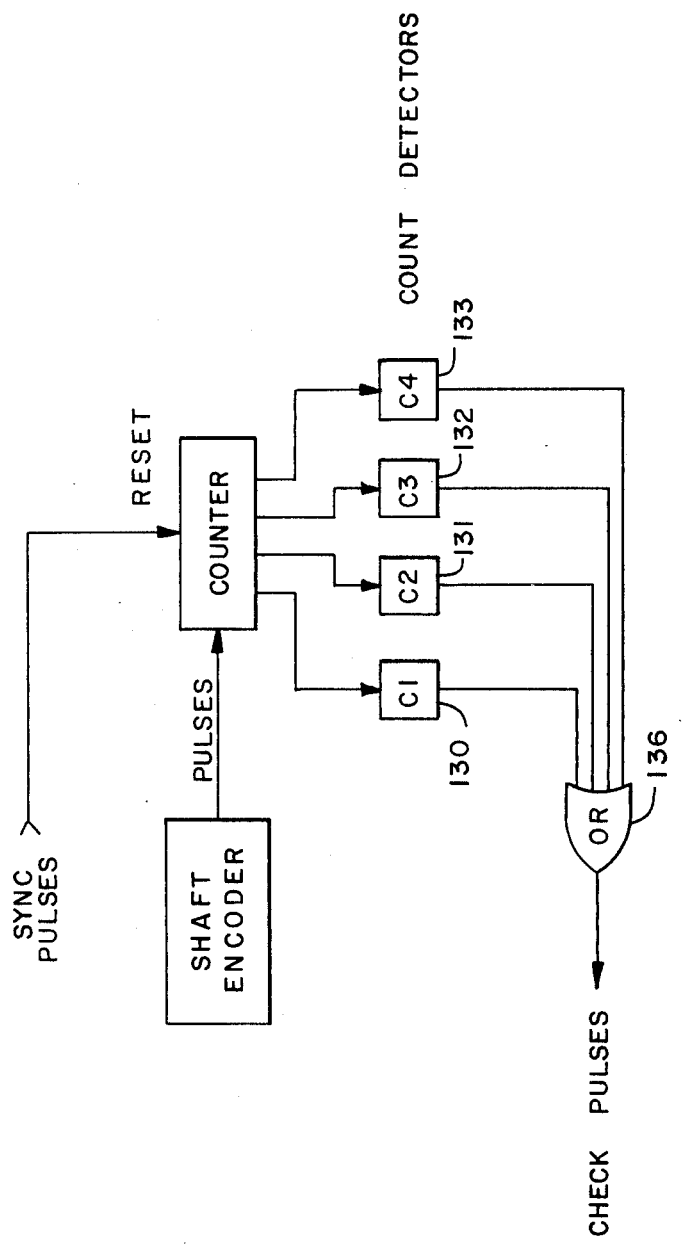
FIG. 12 is a block diagram of the electronics used to generate checkpulse which are utilized for gauging in the X-direction.

At appropriate times during the movement of the web through the gauge, other digital circuitry, illustrated in FIG. 12, produces a checkpulse which is applied to these logic gates. This permits the output of the X-photocells to be examined while the checkpulse is present. The first checkpulse occurs when the distance between the virtual column line 101 of a column of punched holes and the X-slits in the pre-selected row G1–G11, equals the predetermined plus X-tolerance allowable plus one-half the diameter of the hole. This is illustrated as "$d_1$" in FIGS. 13b and d. At the instant that the checkpulse occurs, the photocells for the X-slits are examined to determine if light is present. If so, a hole in that column is out-of-tolerance in the plus X-direction. If no light is present, then the holes are either within tolerance or non-existent. A second checkpulse occurs after the hole has passed the X-slit by an amount such that the distance between the virtual column line 101 and the X-slit is equal to one-half of the hole diameter plus the minus X-tolerance allowable. This distance is indicated as "$d_2$" in FIGS. 13c and e. Once again the X-photocells are examined in the same manner, to determine if any hole in the column is out of tolerance in the minus X-direction. This process is repeated for each column of the punched card. All holes of a column are simultaneously gauged in either the plus or minus X-direction.

FIGS. 13a–e illustrate the process of X-gauging and certain relationships among the hole locations in the web of punched material and certain of the slits in the aperture plate, for various positions of the web as it moves across the aperture plate. There is illustrated, a locator hole 72 and three data holes D1–D3, assumed to be located in an adjacent row of the punched card. It is assumed that X-slit 123 is being used for gauging, being in a preselected one of rows G1–G11. For clarity, Y-slits have been omitted from the FIGS. 13a–e and only three sync slits 83, 122, 124 and three X-slits 80—80, 123 are shown. It is further assumed that the web of punched material containing the holes illustrated in the FIGS. 13a–e, is moving to the right.

In order to generate the checkpulses at precisely the correct instances of time to perform the X-gauging, use is made of the shaft encoder 36 attached to the compound tracking wheel 17. In the embodiment disclosed, the shaft encoder generates a pulse for every 0.0004 inches of movement of the web in the X-direction. By using an electronic counter to count the number of pulses from shaft encoder, as illustrated in FIG. 12, it is a relatively simple matter to measure distances in the X-direction.

The locator hole 72 of each punched card is used as a reference from which dimensions in the X-direction are measured. In particular, the sync slits 83—83 are centered about the center line 82 of the aperture plate, which corresponds to the virtual row line of row 12 of the punched card, when the card is aligned with respect to the aperture plate. This row 12 contains the locator hole 72. In contrast to the X-slits, Y-slits and Y-align slits, LED-photocell pairs are provided for all of the sync slits of the aperture plate which are in correspondence with the LED and photocell boards. The X-slits of the rows G1–G11 of the matrix of X-slits and Y-slits, which are centered along the center line 82 of the aperture plate 53, function as sync slits rather than as X-slits. As the web is pulled through the gauge head, a sync pulse occurs each time the the leading edge of the locator hole 72 passes over one of the sync slits 83—83. For each sync pulse, the counter of FIG. 12, counting the shaft encoder pulses, is reset. Thus the shaft encoder is effectively utilized to measure only a distance equal to the spacing between the sync slits, since the location of the locator hole 72, which is the reference from which all X distances are measured, is re-established for each sync slit. For the aperture plate of FIG. 6, the spacing between the sync slits, as well as the spacing between the rows G1–G11 of the X and Y slits, is 0.2 inches.

This technique has the advantage of minimizing the effects of any cumulative error in the X measurement which may occur due to slippage between the web 11 and the tracking wheels 16, 17. This method of periodically re-establishing the X reference in the manner described, may be referred to as multi-baseline referencing and is a significant factor affecting the measurement accuracy obtainable with the invention.

Figure 13A:
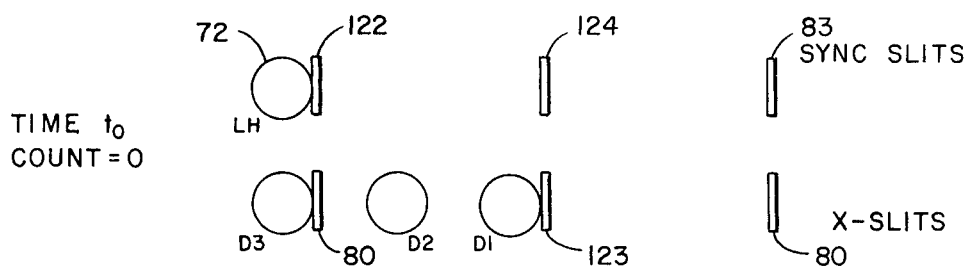
FIGS. 13a-e illustrate certain position relationships between holes in the punched card of FIG. 5 and certain slits in the aperture plate of FIG. 6, which is useful in explaining the manner in which the invention performs gauging in the X-direction.
Figure 13B:
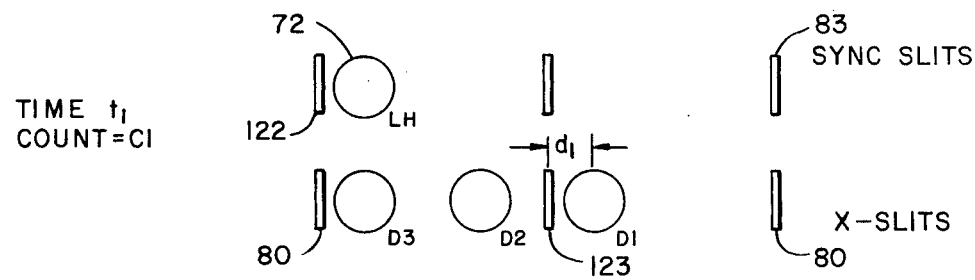

Referring to FIGS. 12 and 13a–e, it is assumed that at time $t_0$ the positions of the holes in the moving web with respect to the aperture plate slits are as illustrated in FIG. 13a. The locator hole 72 has just uncovered the photocell located below sync slit 122, resulting in a sync pulse which resets the counter of FIG. 12 to zero. As the web advances to the position shown in FIG. 13b at time $t_1$, pulses from the shaft encoder cause the counter to advance from zero to a count of C1. Count detector 130 detects this count C1, and outputs a pulse to OR-gate 136, which is output as a checkpulse. This checkpulse is a very narrow pulse, whose duration time is selected such that the distance which the web moves while the pulse is present is negligible with respect to the tolerance being measured.

As previously described, this checkpulse causes the X-photocell monitoring X-slit 123 to be examined to determine whether data hole D1 is within tolerance in the minus X direction. Similarly, this checkpulse is applied to all other X-photocells, not illustrated, in the same row G1–G11 as X-slit 123, to gauge all other data holes in the same card column as D1. Although the remainder of the description of X-gauging describes only the gauging of the illustrated data holes D1–D3, it is to be understood that the other data holes located in the card columns containing holes D1–D3 are simultaneously gauged in the same manner.

Continuing, count C1 is selected such that at time $t_1$, the distance $d_1$ is equal to the aforedescribed sum of the minus X-tolerance and one-half the hole diameter. As will become apparent shortly, data hole D1 had previously been gauged in the plus X-direction by X-slit 123, prior to the occurrence of the sync pulse as described with reference to FIG. 13a.

Figure 13C:
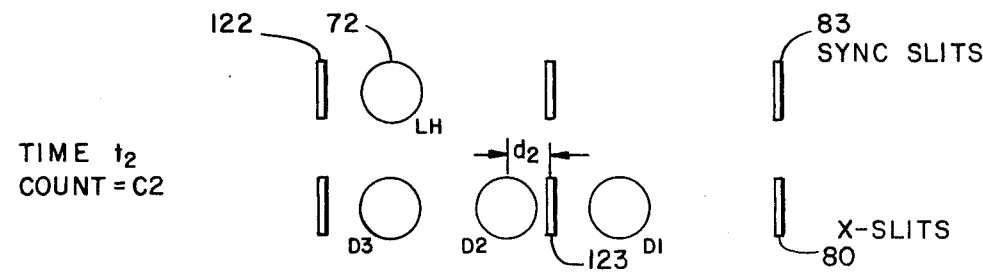

In FIG. 13c, at time $t_2$ data hole D2 has moved to the position illustrated and the counter has advanced from C1 to C2. At this time, distance $d_2$ is equal to the aforedescribed sum of the plus X-tolerance and one-half the hole diameter. Count detector 131 detects count C2 corresponding to this position and produces a pulse which is output from OR-gate 136 as a checkpulse. The checkpulse causes the X-photocell monitoring X-slit 123 to be examined as previously described, to gauge hole D2 in the plus X direction.

Figure 13D:
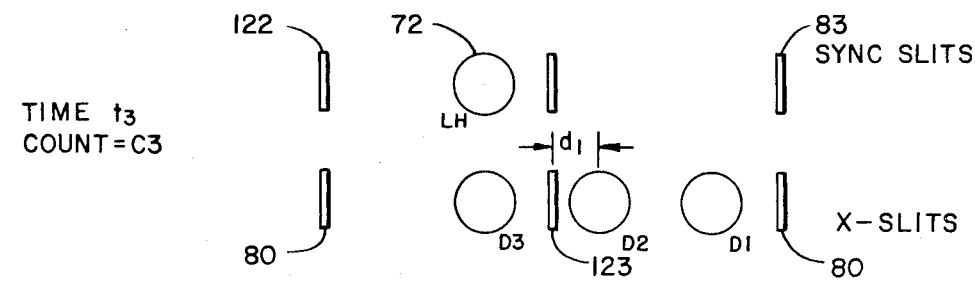
Figure 13E:
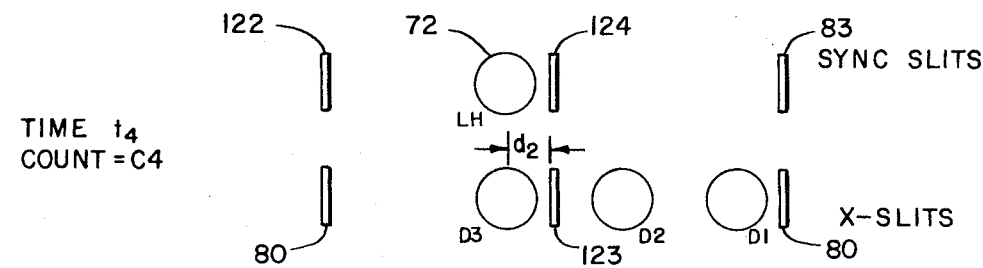

Hole D2 is gauged in the minus X direction when it reaches the position illustrated in FIG. 13d. The counter has advanced to C3, which is detected by count detector 132 to produce the required checkpulse. Similarly, at time $t_4$ hole D3 is gauged in the plus X direction, as illustrated in FIG. 13e. Count detector 133 is adjusted to detect count C4 corresponding to this position.

As the web continues moving to the right, locator hole 72 uncovers sync slit 124 causing the counter to be reset and the above described gauging sequence to be repeated for the next group of data holes. This process is repeated for each sync slit in the aperture plate, which is in correspondence with a sync LED-photocell pair, until the card leaves the gauge.

In contrast to the method of changing the Y-tolerance, which requires the physical re-location of the LED and photocell PC boards, the X-tolerance is selected electronically, by simply adjusting the count detectors 130–133 such that the checkpulses are generated when the number of shaft encoder pulses corresponding to the desired plus and minus X-tolerance is reached. Changing the X-tolerance simply requires changing the counts at which the checkpulses are generated. The electronics required to perform this function, illustrated in block diagram form in FIG. 12, is relatively simple and straightforward and may implemented in a number of ways known to those skilled in the art.

As the web is pulled through the gauge, gauging is performed sequentially on columns 74 through 1, i.e. in a reverse direction. One of the sync slits 83—83 at each end of the aperture plate 53 is utilized in conjunction with the locator hole in column 28 of the punched card to indicate when a card enters and leaves the gauge. As illustrated in FIG. 5, column 6 has a hole in each row for the punched card format utilized except row 12. No column of the card other than column 28 has a hole in row 12. This is the previously described locator hole 72 in column 28. Therefore, column 28 is unique and is easily identifiable by the locator hole which is always present.

The web of punched material is pulled across the aperture plate of FIG. 6 in a direction from bottom to top. When the locator hole of a punched card hits the first one of sync slits 83—83 which is being used, the dimensions of the aperture plate and card of FIG. 5 are such that the first column (column 74) of data holes is just entering the row G1–G11 of the gauge which is being used for gauging. Likewise, when the locator hole passes the last sync slit being used, the last column (column 1) of the card is exiting the row being used for gauging. In this manner, the locator hole of the punched card serves as an indicator, by which the gauge detects when a card enters and leaves the gauge.

As shown in FIG. 10, X photocells are not included in the positions corresponding to the three rows of sprocket holes 70, 71—71 in the card, since sprocket holes are not gauged, although, to make the board universal, photocells could have been included but simply not used in the disclosed embodiment. The LED board however, does have LED's in these positions as can be seen in FIG. 9. This is primarily to insure a relatively uniform source of illumination for the card. Furthermore, it can be seen from FIG. 6, that the aperture plate does contain X-slits and Y-slits in the positions corresponding to the sprocket holes, although these slits are not used in the present embodiment, since photocells are not included on the photocell board. This was done in order to permit the aperture plate to be used for gauging cards with different formats, but similar dimensions, to that shown in FIG. 5.

The card gauge may be further provided with means for placing a mark or otherwise indicating on the web, those cards which are out-of-tolerance. These means may be implemented in any of a variety of known ways. Consequently, no specific embodiment has been included in the drawings.

While the foregoing has been with reference to the particular embodiment disclosed, it will be appreciated by those skilled in the art that variations are possible without departing from the spirit and the intent of the invention. It is intended that the invention be limited only by the appended claims.

What is claimed is:

1. An apparatus for automatically gauging the tolerance of the positions of individual holes punched in a continuously moving web of material of indefinite length, comprising:
- an opaque plate having arranged thereon a plurality of transparent apertures through which light may pass, said apertures being narrow slits having their narrow dimension small with respect to the size of the holes being gauged and arranged such that the narrow dimension of said slits is parallel to the dimension in which the holes are being gauged;
- means for illuminating said apertures with light;
- means for positioning the web of punched material between said plate and said light means such that the holes in the punched material are in a predetermined relationship with respect to said apertures; and
- light-detecting means positioned so as to be in optical correspondence with and responsive to any light passing through the holes in the web of punched material and said transparent apertures, for indicating out-of-tolerance holes.

2. The apparatus of claim 1 wherein said transparent apertures further comprise at least one group of narrow slits arranged on said opaque plate such that their narrow dimension is transverse to the direction of movement of the web of punched material, said slits being adapted for gauging the positions of said holes in a dimension transverse to the direction of movement of the web.

3. The apparatus of claim 2 wherein said slits further comprise pairs of slits, each slit of a pair being separated from the other slit of the pair by a predetermined distance transverse to the direction of movement of the web of punched material, said pairs of slits being located on said plate such that the two slits of a pair are positioned equidistant on either side of one or more virtual center lines parallel to the direction of movement of the web through the centers of perfectly positioned holes in the web.

4. The apparatus of claim 3 wherein the tolerance measurement applied to the positions of said holes in said transverse dimension is selected by selecting said predetermined distance between slits of a pair.

5. The apparatus of claim 1 wherein said transparent apertures further comprise at least one group of narrow slits arranged on said opaque plate such that their narrow dimension is parallel to the direction of movement of the web of punched material and located on said plate such that said holes pass over said slits, said slits being adapted for gauging the positions of said holes in a longitudinal dimension, said dimension being parallel to the direction of movement of the web.

6. The apparatus of claim 5 further comprising:
- means for establishing at least one coordinate reference location on said web of punched material, from which location the positions of said holes are defined;
- means for measuring the distance said web of punched material moves with respect to said slits in said opaque plate; and
- means for periodically reestablishing the position of said coordinate reference with respect to said slits in said opaque plate, in order to minimize the effect of any cumulative error in measuring said distance.

7. The apparatus of claim 6 further comprising means for periodically examining said slits at predetermined distances between said holes in the moving web and said slits, in order to detect the presence of any light passing through one or more of said slits, whereby out-of-tolerance holes are indicated.

8. The apparatus of claim 7 wherein the tolerance measurement applied to the positions of said holes in said longitudinal dimension is selected by selecting said predetermined distances between said holes and said slits, at which distance said slits are examined to detect the presence of light.

9. The apparatus of claim 1 further comprising:
- a structurally unitary gauge head assembly in which said opaque plate, said light means and said light-detecting means are mounted in an adjustable relationship to one another, said gauge head assembly having a narrow slot between said plate and said light means through which the moving web passes, said gauge head assembly further being adjustably mounted with respect to the moving web;
- means for aligning said gauge head assembly with respect to the web of material such that said apertures are placed in said predetermined relationship with respect to the holes in said web; and
- means for maintaining the alignment of the web of punched material with respect to said gauge head assembly as said web moves through said gauge head assembly.

10. The apparatus of claim 9 wherein said web of punched material has punched therein a row of regularly spaced sprocket holes and said maintaining means includes a pair of compound tracking wheels fixedly mounted with respect to said gauge head assembly for guiding the web of punched material through the gauge head assembly, each of said compound tracking wheels comprising:
- a shaft having fixedly mounted thereon a pair of wheel sections; and
- a sprocket wheel assembly disposed on said shaft between said pair of wheel sections and freely rotatable with respect to said shaft, said sprocket wheel having located on the circumference thereof sprocket pins disposed so as to engage the sprocket holes in the web of punched material.

11. The apparatus of claim 9 wherein said means for aligning said gauge head assembly with respect to the web includes a pair of alignment slits located on and near each end of said opaque plate and means for determining when a reference hole in the punched material passes between each of the slits of a pair of said slits such that no light passes through any of said alignment slits.

12. The apparatus of claim 10 wherein said gauge head assembly further includes spring means for permitting relative vertical movement between the components contained within said gauge head assembly, thereby preventing damage to said components due to the web of material becoming jammed in said gauge head assembly.

13. The apparatus of claim 1 wherein out-of-tolerance holes in the moving web expose a portion of one or more of said slits to said light means permitting light to pass therethrough, thereby indicating out-of-tolerance holes.

14. The apparatus of claim 13 wherein said slits are arranged on said plate for gauging tolerance in two dimensions.

15. An apparatus for automatically gauging the tolerance of the positions of individual holes punched in a continuously moving web of material of indefinite length, comprising:

an opaque plate having arranged thereon a plurality of transparent apertures through which light may pass, said apertures adapted for gauging the tolerance of the positions of the holes in the web in a direction parallel to the direction of movement of the web;

means for illuminating said apertures with light;

light-detecting means positioned so as to be in optical correspondence with and responsive to the light passing through said apertures;

means for positioning the web of punched material between said opaque plate and said light means such that the holes in the web of punched material are in a predetermined relationship with respect to said apertures and wherein said holes pass over said apertures;

means for periodically establishing the location of at least one coordinate reference point on the web of punched material with respect to said apertures, from which coordinate reference the positions of the holes are defined;

means coupled to the web of punched material for measuring the distance the web moves with respect to said plate between the positions of the web where said coordinate reference point is periodically established; and means responsive to said measuring means for examining the outputs of said light-detecting means at preselected distances between the holes in the moving web and said apertures to detect the presence of light, thereby indicating out-of-tolerance holes.

16. The apparatus of claim 15 wherein said transparent apertures are narrow slits having their narrow dimension small with respect to the size of the holes being gauged, and including at least a first group of slits arranged on said plate with their narrow dimension parallel to the direction of movement of the web and positioned such that the holes in the web pass over said slits.

17. The apparatus of claim 15 wherein the tolerance measurement applied to the hole positions in the web is determined by said preselected distances, said preselected distances being equal to plus and minus the sum of one-half of the diameter of the holes and the desired tolerance of the hole position.

18. The appratus of claim 17 wherein the means for measuring the distance the web moves with respect to said plate comprises:

a tracking wheel engaging the moving web of material and adapted to rotate with an angular displacement proportional to the distance the web moves with respect to said plate;

a shaft encoder coupled to said tracking wheel for generating electrical pulses proportional to the angular rotation of said tracking wheel;

a counter for counting said electrical pulses to provide a measurement of the distance the web moves with respect to said plate; and means for resetting said counter at said positions of the web at which the position of said coordinate reference point is established with respect to said apertures.

19. The apparatus of claims 1 and 15 wherein the web of material includes a plurality of regularly spaced reference holes along the length of the web and said means for positioning the web with respect to said apertures in said opaque plate comprises:

a pair of narrow transparent slits located at each end of said opaque plate, said narrow slits having their narrow dimension small with respect to the diameter of the reference holes and arranged on said plate such that their narrow dimension is transverse to the direction of movement of the web, said slits of each pair spaced apart in a transverse dimension by an amount slightly greater than the diameter of the reference holes;

light means for illuminating each pair of slits;

light-detecting means for detecting light passing through each of said slits of said pairs; and means for adjusting the position of said plate in a transverse dimension to the movement of the web such that said reference holes in the web pass between the slits of each pair, thereby blocking light from passing therethrough and indicating the correct positioning of the web with respect to said plate.

* * * * *